UNITED STATES PATENT OFFICE.

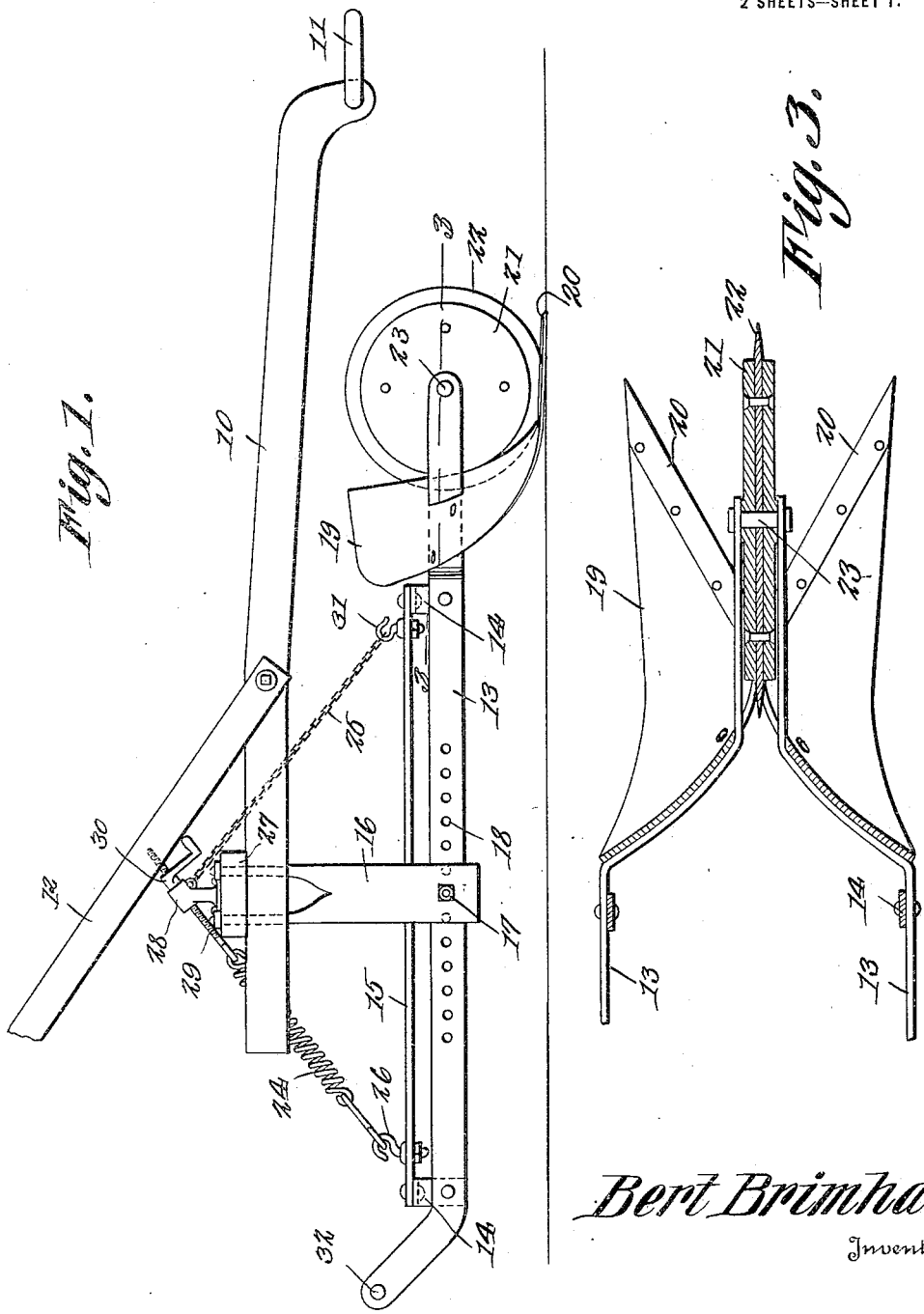

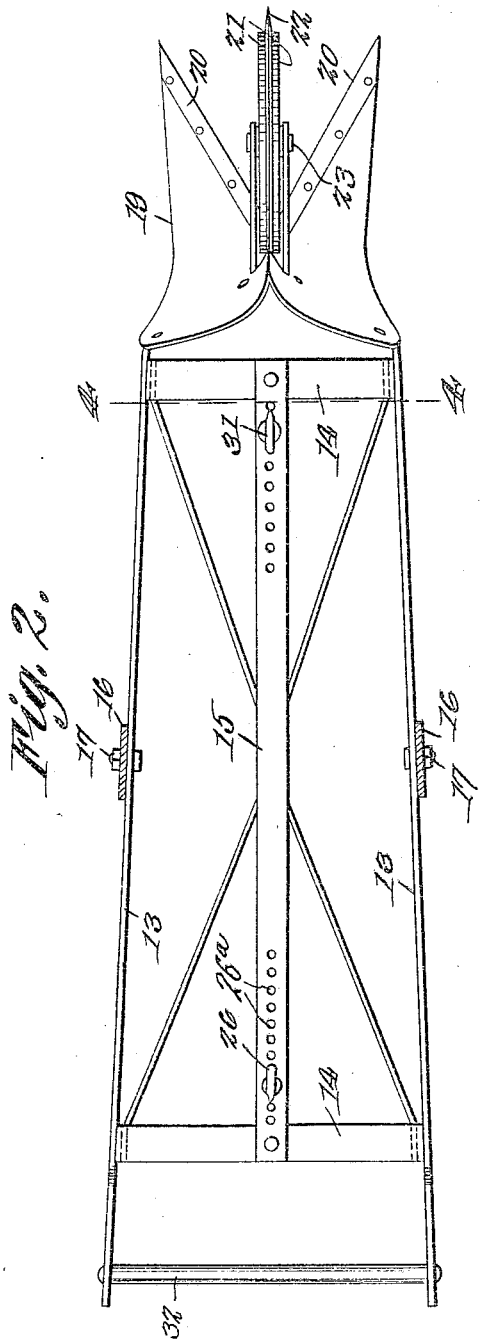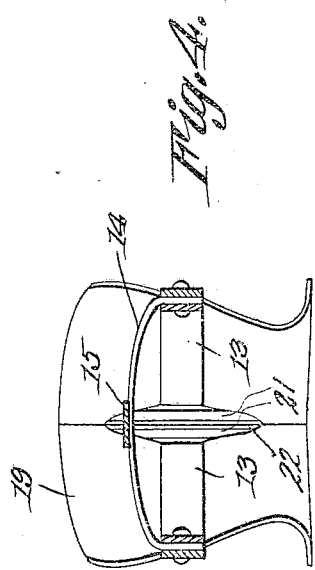

BERT BRIMHALL, OF SALT LAKE CITY, UTAH.

VEGETABLE-TOPPING DEVICE.

1,294,388. Specification of Letters Patent. Patented Feb. 18, 1919.

Application filed May 4, 1918. Serial No. 232,640.

*To all whom it may concern:*

Be it known that I, BERT BRIMHALL, a citizen of the United States, residing at Salt Lake City, in the county of Salt Lake and State of Utah, have invented new and useful Improvements in Vegetable-Topping Devices, of which the following is a specification.

This invention relates to implements for topping beets and its object is to provide a device of this kind which is so constructed and arranged that the tops are severed uniformly, a novel means being provided by which the proper depth at which the topping knives operate is automatically maintained.

The invention is designed primarily for topping beets but it will be understood that it may be employed with equal facility for topping other vegetables.

In order that the invention may be better understood, reference is had to the accompanying drawings forming a part of this specification, and in said drawings, Figure 1 is a side elevation of the implement;

Fig. 2 is a plan view thereof;

Fig. 3 is an enlarged horizontal section on the line 3—3 of Fig. 1, and

Fig. 4 is a cross section on the line 4—4 of Fig. 2.

Referring specifically to the drawing 10 denotes the frame of a plow provided with suitable means 11 at its forward end for attachment of draft animals, and handles 12 at its rear end. This frame carries a plow for digging and lifting the beets out of the ground, and as the same is not a part of the present invention it has not been illustrated, and only so much of the frame is shown as will suffice to make clear the application of the invention thereto.

Beneath the frame 10 is mounted a tiltable supporting frame for the beet topping mechanism. This supporting frame consists of a pair of laterally spaced bars 13 extending lengthwise of the implement and connected near its ends by cross bars 14, which latter are connected by a center longitudinal bar 15.

The frame bars 13 are pivotally connected intermediate their ends, to swing in a vertical plane, to hangers 16 depending from the frame 10, the connection being made by bolts 17, the bars 13 having alined bolt holes 18. A longitudinal series of bolt holes is provided so that the bars 13 may be shifted in the direction of their length to obtain the proper balance.

The front ends of the frame bars 13 carry a double mold board 19 equipped at its bottom or point with removable beet topping knives 20. In front of the mold board is located a gage wheel to be presently described.

The beet-topping knives 20 are set horizontally with a V-shaped space therebetween, the flare of the space being forward. Thus, when the knives advance as the implement is drawn forward, the beet tops, upon passing into the space between the knives, are severed with a draw cut. The severed tops are thrown aside by the mold board 19.

The gage wheel is set in line with the apex of the mold board 19, close thereto, a slot being made therein into which the wheel extends for a short distance. The wheel is provided with a cutter which is so located that its cutting edge works at the same level as the knives 20 in line with the center of the V-shaped space therebetween. The gage wheel consists of a pair of gage disks 21 with a cutter disk 22 therebetween of greater diameter than the former so that it projects from the periphery thereof. The disks 21 run on the crown of the beets and therefore gage the extent to which the disk 22 penetrates the same to cut into the beet tops. The disks are suitably connected to form one rigid unitary structure, and they are loosely journaled on an axle 23 carried by the forward ends of the frame bars 13, these bars being here made converging and brought together to accommodate the disks. The mold board 19 has openings through which the frame bars 13 pass, and it is suitably fastened to said bars.

The frame carrying the hereinbefore described assembly of topping and gage devices at its forward end, is provided with means whereby this end is pressed down so that the gage wheel 21 is held yieldingly in contact with the crown of the beets. This is done by connecting one end of a coiled spring 24 to its rear end, the other end of said spring being anchored to the plow frame. The extent to which the beet topping frame may tilt is regulated by a chain 25 connected at one end to said frame in front of its pivot 17 and at the other end to the plow frame.

The spring 24 is connected to the frame 13 by a hook bolt 26 carried by the bar 15, said bar having a plurality of bolt holes 26ª so that the point of attachment may be adjusted forwardly or rearwardly. The plow frame 10 carries a cross beam 27 which supports the hangers 16, and also an upstanding bracket 28 through which loosely passes a rod 29 to which the upper end of the spring 24 is connected. On the rod 29, back of the bracket, is screwed a lever nut 30, the rod being threaded for this purpose. Upon turning the nut 30 the rod 29 is drawn back or forth, and thus the tension of the spring 24 can be readily regulated.

The chain 25 is connected at one end to the beet topping frame by a hook bolt 31 adjustable in the same manner as the bolt 26, and its other end is connected to the bracket 28.

In operation, the gage wheel 21 is held down on the crown of the beets by the spring 24 and pressed down on the beet tops, and as it is free to yield it follows the ground and tops closely. The topping knives 20 rise and fall with the gage wheel and the horizontal plane in which they operate is therefore determined by said wheel, so that the beet tops are found irrespective of the height they project from the ground, and they are uniformly severed. The disk or rolling cutter 22 penetrates the beet tops as far as the distance it projects from the periphery of the gage wheel 21, and as this cutter works in a slot in the mold board 19, the latter serves as a scraper to keep the cutter clean.

The rear ends of the frame bars 13 have upward bends and are provided with a handle 32.

I claim:

1. A vegetable topper comprising a double mold board, horizontal topping knives on the point of the mold board and arranged opposite each other in spaced relation, a gage wheel in front of the mold board for determining the cutting plane of the topping knives, and a pivoted frame carrying the mold board and the gage wheel.

2. A vegetable topper comprising a double mold board, horizontal topping knives on the point of the mold board and arranged opposite each other in spaced relation, a gage wheel in front of the mold board for determining the cutting plane of the topping knives, a rolling cutter projecting from the periphery of the gage wheel, the mold board having a slot in its apex into which said cutter extends, and a pivoted frame carrying the mold board and the gage wheel.

3. A vegetable topper comprising a double mold board, horizontal topping knives on the point of the mold board and arranged opposite each other in spaced relation, a gage wheel in front of the mold board for determining the cutting plane of the topping knives, a rolling cutter projecting from the periphery of the gage wheel, and a pivoted frame carrying the mold board and the gage wheel.

4. A vegetable topper comprising a double mold board, horizontal topping knives on the point of the mold board and arranged opposite each other in spaced relation, a gage wheel in front of the mold board for determining the cutting plane of the topping knives, a pivoted frame carrying the mold board and the gage wheel, and means connected to said frame for yieldingly holding the gage wheel to the ground.

5. A vegetable topper comprising a pair of opposite and laterally spaced topping knives set horizontally, a pivoted support for said knives, and a gage wheel carried by the support in line with the space between the knives for determining the cutting plane thereof.

6. A vegetable topper comprising a pair of opposite and laterally spaced topping knives set horizontally, a pivoted support for said knives, a gage wheel carried by the support in line with the space between the knives for determining the cutting plane thereof, and a rolling cutter projecting from the periphery of the gage wheel.

7. A vegetable topper comprising a pair of opposite and laterally spaced topping knives set horizontally, a pivoted support for said knives, a gage wheel carried by the support in line with the space between the knives for determining the cutting plane thereof, and means connected to the support for yieldingly holding the gage wheel to the ground.

In testimony whereof I affix my signature.

BERT BRIMHALL.

Copies of this patent may be obtained for five cents each, by addressing the "Commissioner of Patents, Washington, D. C."